No. 772,703. Patented October 18, 1904.

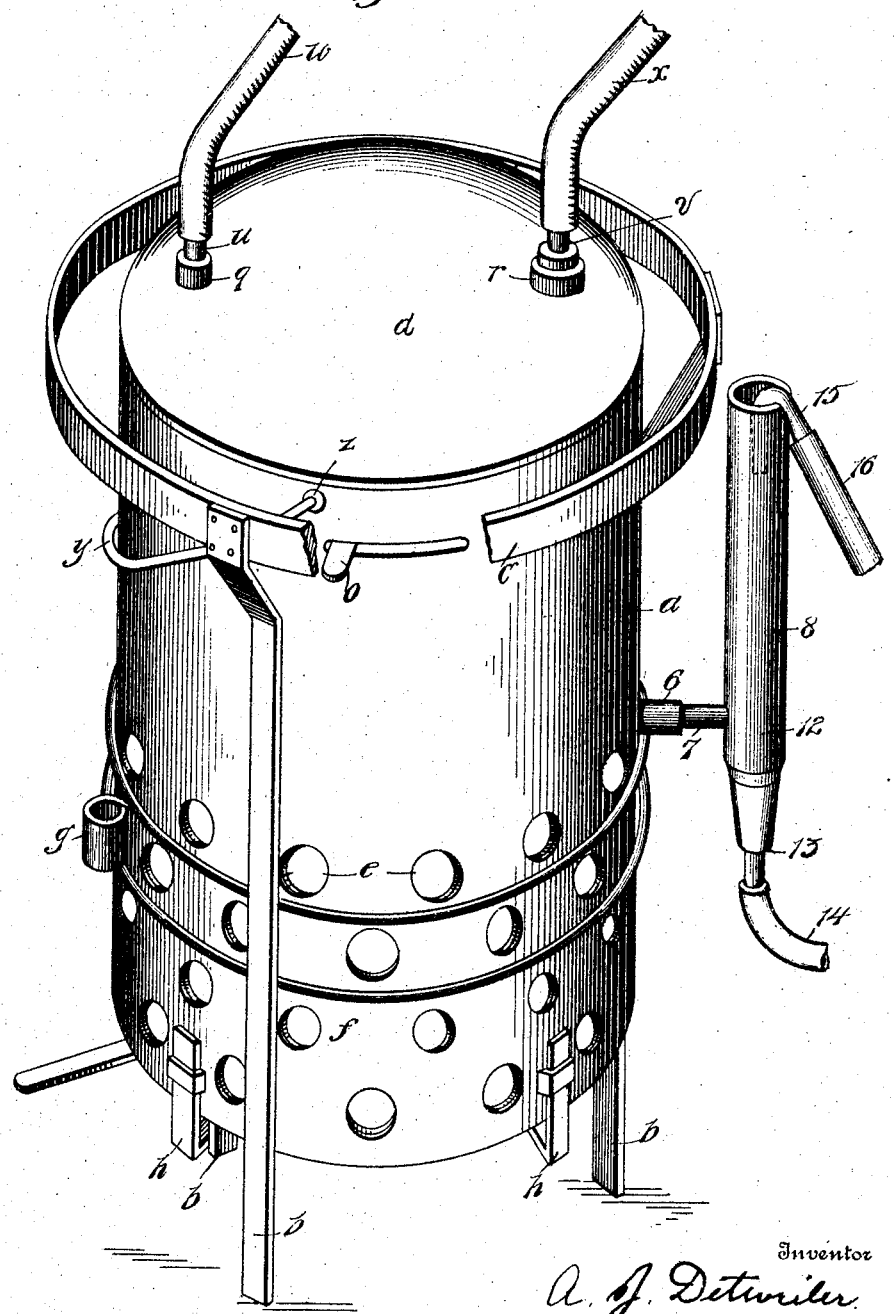

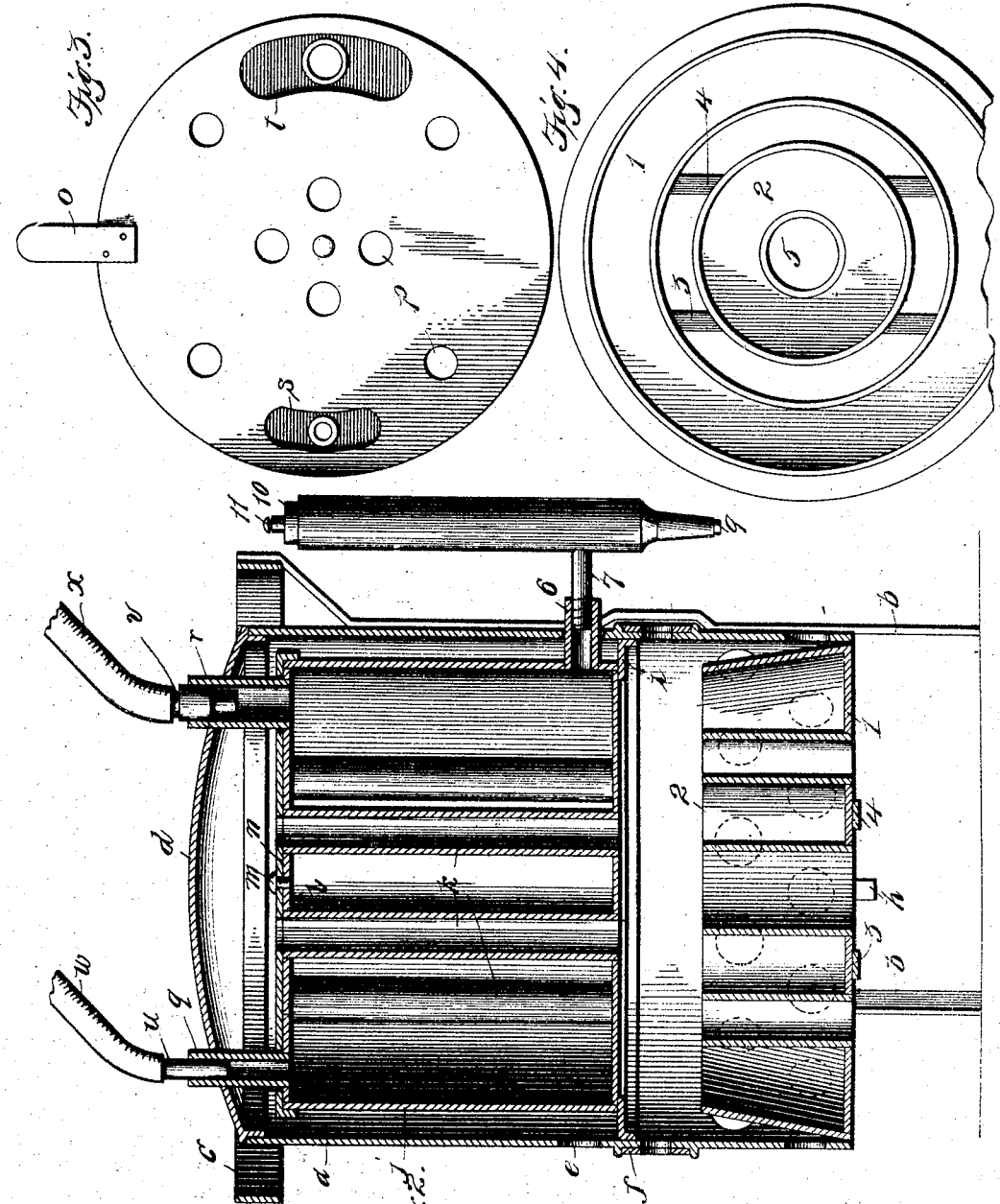

UNITED STATES PATENT OFFICE.

ANDREW JACKSON DETWEILER, OF COLUMBIA, MISSOURI.

PROCESS OF PRODUCING SUPERHEATED VAPOR AT ATMOSPHERIC PRESSURE.

SPECIFICATION forming part of Letters Patent No. 772,703, dated October 18, 1904.

Application filed October 8, 1903. Serial No. 176,239. (No model.)

*To all whom it may concern:*

Be it known that I, ANDREW JACKSON DETWEILER, a citizen of the United States, residing at Columbia, in the county of Boone and State of Missouri, have invented certain new and useful Improvements in Processes of Producing Superheated Vapor at Atmospheric Pressure; and I do hereby declare the following to be a full, clear, and exact description of the invention, such as will enable others skilled in the art to which it appertains to make and use the same.

My invention relates to an improvement in processes of producing superheated vapor at atmospheric pressure.

My invention is primarily used in connection with a formalin-disinfector; but it may be used in disinfecting and sterilizing purposes generally. It may also be used for the production of superheated vapor for organic distillation, for canning fruits and vegetables, and for cooking purposes. Furthermore, it may be used for heating houses either by passing the superheated vapor through coils of pipe or by heating each room directly with an apparatus adapted to carry out my invention.

In the accompanying drawings, which represent an apparatus used in carrying out my process, Figure 1 represents a side view of said apparatus. Fig. 2 is a cross-section of the same. Fig. 3 is a top plan view of the boiler, and Fig. 4 is a top plan view of the alcohol-lamp.

$a$ represents the outer casing, preferably made of metal and preferably circular in form. This is supported on legs $b$ $b$, attached to the outer part of the casing $a$, which legs are inclined outwardly near the top and are attached to a ring $c$. The casing $a$ is open at the bottom and is adapted to be closed at the top by a removable lid or cover $d$. The casing $a$ is provided with a number of rows of holes $e$, preferably arranged as shown in Fig. 1. Around one of the rows of holes is a sliding perforated damper $f$, provided with a handle $g$, by which the holes in this row may be wholly or partly closed, as desired. Each of these circular rows of holes may be provided with a similarly-shaped damper, if desired.

At the bottom of the casing a number of spring-clips $h$ are provided for the purpose of holding the lamp or other heating means in position. The damper $f$ is preferably made of a circular strip of metal, perforated, as shown, and with one end rolled up to form a handle, as shown at $g$.

Within the casing $a$ is an annular shelf $i$, secured to the casing in any suitable manner. This shelf serves as a support for the boiler $j$. The boiler $j$ is preferably made of copper and is provided with a number of flues $k$ passing through the top and bottom thereof. In the drawings this boiler is shown as provided with eight flues arranged in two circles; but any number of flues, as desired, may of course be used. Centrally on the top $l$ of the boiler is secured a screw $m$, on which is revolubly mounted a plate $n$, provided with a handle $o$. This plate $n$ is provided with a number of perforations $p$, arranged to register with the tops of the flues $k$. By turning the plate $n$ by means of the handle $o$ the flues may be wholly or partially closed, as desired.

Through the top $l$ of the boiler and through the plate $n$ pass two tubes $q$ and $r$ for the delivery of the superheated vapor. These tubes are firmly attached to the top $l$ of the boiler, and the plate $n$ is provided with curved slots $s$ and $t$, so that said plate may be moved without interference by the pipes $q$ and $r$. When the apparatus is to be used as a formalin-disinfector, the top of the tubes $q$ and $r$ are closed with corks, through which pass tubes $u$ and $v$, preferably of glass, to which tubes flexible tubes $w$ and $x$ are attached, so that the formalin vapor may be delivered to the desired point.

The casing $a$ is provided with a handle $y$, attached to ears $z$, for convenience in handling the same. Underneath the boiler and secured in position by the spring-clips $h$ is the lamp or other heating material. The lamp shown in Fig. 4 is an alcohol-lamp, which is composed of two concentric portions 1 and 2, united by braces 3 and 4. The part 2 is provided with a central opening 5, and the parts 1 and 2 are filled with asbestos, upon which alcohol is poured. Of course it is obvious that any desired means of heating the boiler $j$ may be employed instead of an alcohol-lamp.

In order to feed the liquid to be vaporized into the boiler $j$, a pipe 6 is provided, which passes through the boiler $j$ and casing $a$. Into this is screwed a smaller pipe 7, which connects with a larger pipe 8, into which the liquid to be vaporized is poured. The pipe 8 is open at the bottom and the top; but when used as a formalin-disinfector both the top and bottom are closed by corks 9 and 10, the latter being inserted after the liquid has been poured into the pipe 8. The cork 10 is provided with an ordinary light whistle 11, such as is often used with cooking utensils, to show when the liquid in the boiler has become exhausted or nearly exhausted.

In case water is to be vaporized and where there is an abundant supply of water instead of closing the tube 8 by corks I use the water-level shown in Fig. 1. This consists of a pipe 12, preferably of glass, which is movably secured in a cork 13 in the lower end of the pipe 8. This pipe 12 serves as an overflow-pipe and prevents the liquid in the boiler $j$ from reaching too high a level. The lower part of the pipe 12 is connected to a waste pipe 14, preferably of flexible material. The water is supplied to the tube 8 by means of the bent pipe 15, which is connected by a flexible pipe 16 to a suitable source of supply. The water as it is delivered into the pipe 8 passes into the boiler $j$ until it reaches the top of the pipe 12, when the excess, if any, passes out through said pipe.

In using the apparatus as a formalin-disinfector I take the commercial solution of formalin, which contains about forty per cent. thereof, and dilute it with two to four volumes of water. The solution is then introduced into the pipe 8, which is then closed by the cork 10. A measured amount of the solution may be introduced, or the pipe 8 may be provided with a glass window, so that the amount of liquid in the boiler $j$ may be easily seen. The lamp is then lighted and the hot air and products of combustion pass upwardly through the flues $k$, heating the liquor contained in the boiler and superheating the vapor in the upper part of the boiler. The hot air and products of combustion then pass over the top of the boiler and down around the sides thereof, still further heating the vapor, and out through the upper row of holes $e$. The formalin vapor thus produced, which is considerably hotter than boiling water, passes out through the tubes $w$ and $x$. These tubes $w$ and $x$ are passed through holes in the door, one hole being produced by removing the lock and the other through the opening made for the bolt which carries the door-knob. The vapor is thus delivered in a superheated condition into the room which it is desired to disinfect.

In an apparatus of ordinary size two delivery-tubes are necessary, inasmuch as the vapor produced will not be carried off through a half-inch tube and a larger tube cannot be used on ordinary doors.

By my process, using the simple apparatus above described, I am enabled at atmospheric pressure to produce vapor which is considerably superheated. In the apparatus shown I produce vapor superheated to 250° centigrade, the gist of my process being that the flame and products of combustion first strike a vessel containing the liquid to be heated and then pass up over the top of said vessel and down around it again, thereby superheating the vapor above the liquid, the top of the vessel or boiler being all the time open to the air.

Having thus described my invention, what I claim as new, and desire to secure by Letters Patent, is—

1. The process of producing superheated vapor at atmospheric pressure, which consists in causing flame or hot products of combustion to impinge upon a vessel containing the liquid to be heated and then causing said flame and products of combustion to pass over the top and down around the sides of said vessel, said vessel being provided with an opening communicating directly with the air, substantially as described.

2. The process of producing superheated vapor at atmospheric pressure, which consists in causing flame or hot products of combustion to pass up through a vessel containing the liquid to be heated, said vessel being provided with exit-openings communicating directly with the air and then to pass over the top of said vessel and down around the sides thereof, substantially as described.

3. The process of producing superheated vapor at atmospheric pressure, which consists in partially filling a boiler, provided with flues, with liquid, causing flame or hot products of combustion to pass upward through said flues and then over the top of said boiler and then down around its sides, said boiler being provided with openings communicating directly with the air, substantially as described.

In testimony whereof I affix my signature in presence of two witnesses.

ANDREW JACKSON DETWEILER.

Witnesses:
F. D. EVANS,
J. W. SAPP.